(12) United States Patent
Lee et al.

(10) Patent No.: US 11,363,628 B2
(45) Date of Patent: Jun. 14, 2022

(54) METHOD AND APPARATUS FOR PERFORMING UPLINK TRANSMISSION WITH PRE-ALLOCATED BEAMS IN WIRELESS COMMUNICATION SYSTEM

(71) Applicant: LG ELECTRONICS INC., Seoul (KR)

(72) Inventors: Youngdae Lee, Seoul (KR); Sunyoung Lee, Seoul (KR); Yejee Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 107 days.

(21) Appl. No.: 16/771,188

(22) PCT Filed: Feb. 14, 2019

(86) PCT No.: PCT/KR2019/001792
§ 371 (c)(1),
(2) Date: Jun. 9, 2020

(87) PCT Pub. No.: WO2019/160343
PCT Pub. Date: Aug. 22, 2019

(65) Prior Publication Data
US 2021/0176677 A1    Jun. 10, 2021

Related U.S. Application Data

(60) Provisional application No. 62/630,272, filed on Feb. 14, 2018.

(51) Int. Cl.
*H04W 74/02* (2009.01)
*H04W 72/14* (2009.01)
(Continued)

(52) U.S. Cl.
CPC ....... *H04W 74/02* (2013.01); *H04W 36/0072* (2013.01); *H04W 36/023* (2013.01);
(Continued)

(58) Field of Classification Search
CPC . H04W 74/02; H04W 74/04; H04W 74/0808; H04W 74/0833; H04W 8/26;
(Continued)

(56) References Cited

U.S. PATENT DOCUMENTS 8,194,694 B2    6/2012  Kato et al.
2015/0105084 A1    4/2015  Bontu et al.
(Continued)

FOREIGN PATENT DOCUMENTS

WO    2014021611 A1    7/2013
WO    2015/117275 A1    8/2015
WO    2017191919 A1    11/2017

*Primary Examiner* — Joshua Kading
(74) *Attorney, Agent, or Firm* — Dentons US LLP

(57) ABSTRACT

A method and apparatus for performing an uplink (UL) transmission with pre-allocated beams in a wireless communication system is provided. A user equipment (UE) receives a connection release message from a network in a first state. The connection release message includes information on a pre-allocated UL resource for UL transmission with pre-allocated beams. The UE enters a second state from the first state, selects a cell, and performs the UL transmission to the cell in the second state via the pre-allocated beams based on the pre-configured UL resource for UL transmission when a data is available for transmission. The first state may be a radio resource control (RRC) connected state, and the second state may be an RRC inactive state and/or an RRC idle state.

16 Claims, 7 Drawing Sheets

(51) Int. Cl.
*H04W 74/08* (2009.01)
*H04W 76/27* (2018.01)
*H04W 36/00* (2009.01)
*H04W 36/02* (2009.01)
*H04W 72/04* (2009.01)
*H04W 74/04* (2009.01)
*H04L 5/00* (2006.01)
*H04W 8/26* (2009.01)

(52) U.S. Cl.
CPC ..... *H04W 72/042* (2013.01); *H04W 72/0413* (2013.01); *H04W 72/14* (2013.01); *H04W 74/04* (2013.01); *H04W 74/0808* (2013.01); *H04W 74/0833* (2013.01); *H04W 76/27* (2018.02); *H04L 5/005* (2013.01); *H04W 8/26* (2013.01)

(58) Field of Classification Search
CPC ........... H04W 36/0072; H04W 36/023; H04W 72/0413; H04W 72/042; H04W 72/14; H04W 76/27; H04L 5/005
See application file for complete search history.

(56) References Cited

U.S. PATENT DOCUMENTS

| | | |
|---|---|---|
| 2017/0041841 A1 | 2/2017 | Pedersen et al. |
| 2017/0331670 A1 | 11/2017 | Parkvall et al. |
| 2019/0052435 A1* | 2/2019 | Martin .............. H04W 72/0413 |
| 2019/0110300 A1 | 4/2019 | Chen et al. |
| 2019/0200248 A1 | 4/2019 | Basu Mallick et al. |
| 2019/0141783 A1 | 5/2019 | Malik et al. |
| 2019/0166553 A1* | 5/2019 | Ryoo .................... H04W 76/28 |
| 2019/0246442 A1* | 8/2019 | Park ................... H04W 72/0453 |
| 2019/0253941 A1* | 8/2019 | Cirik ................. H04W 36/0077 |
| 2021/0112598 A1* | 4/2021 | Ryu ................. H04W 74/0833 |

* cited by examiner

[Fig. 1]
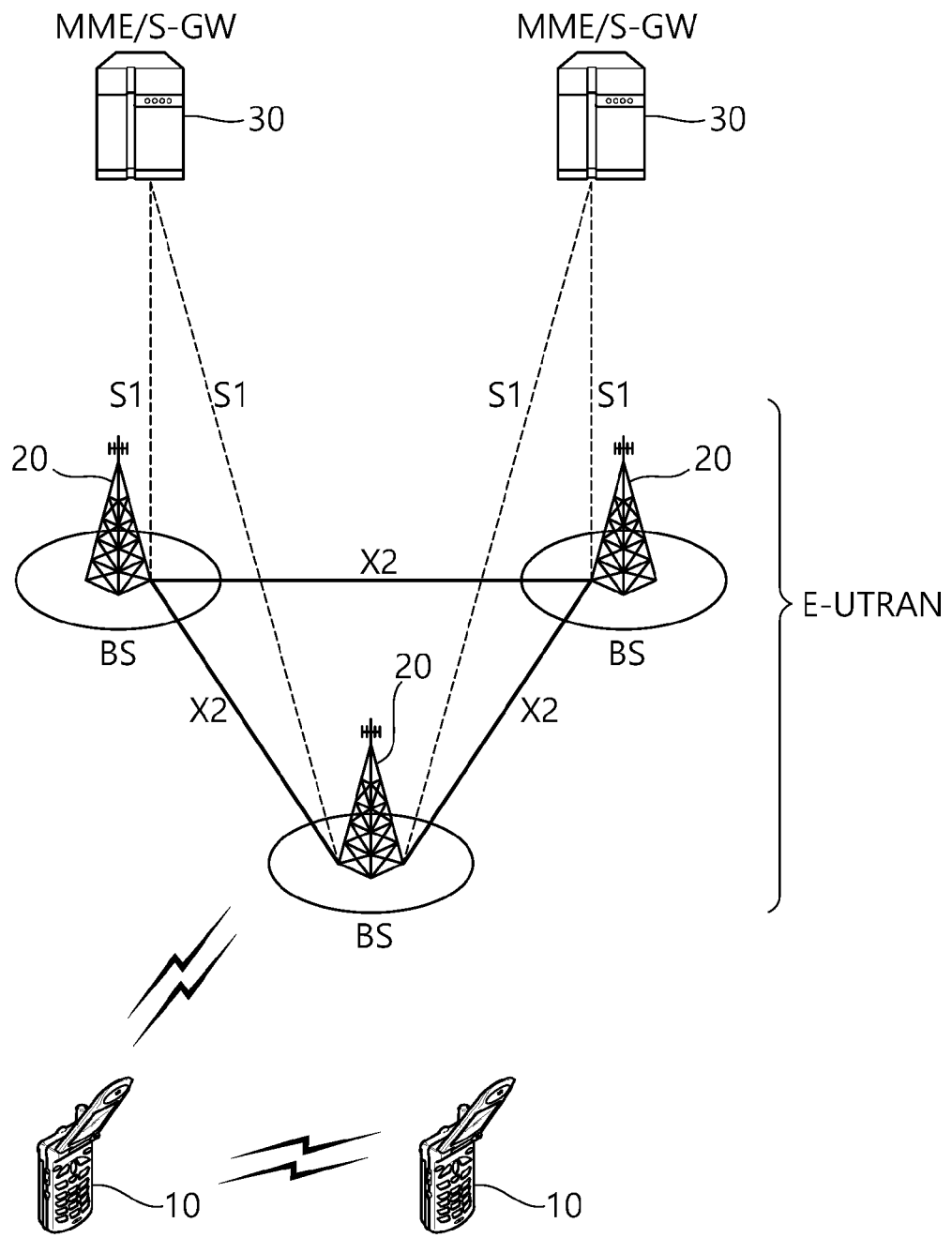

[Fig. 2]
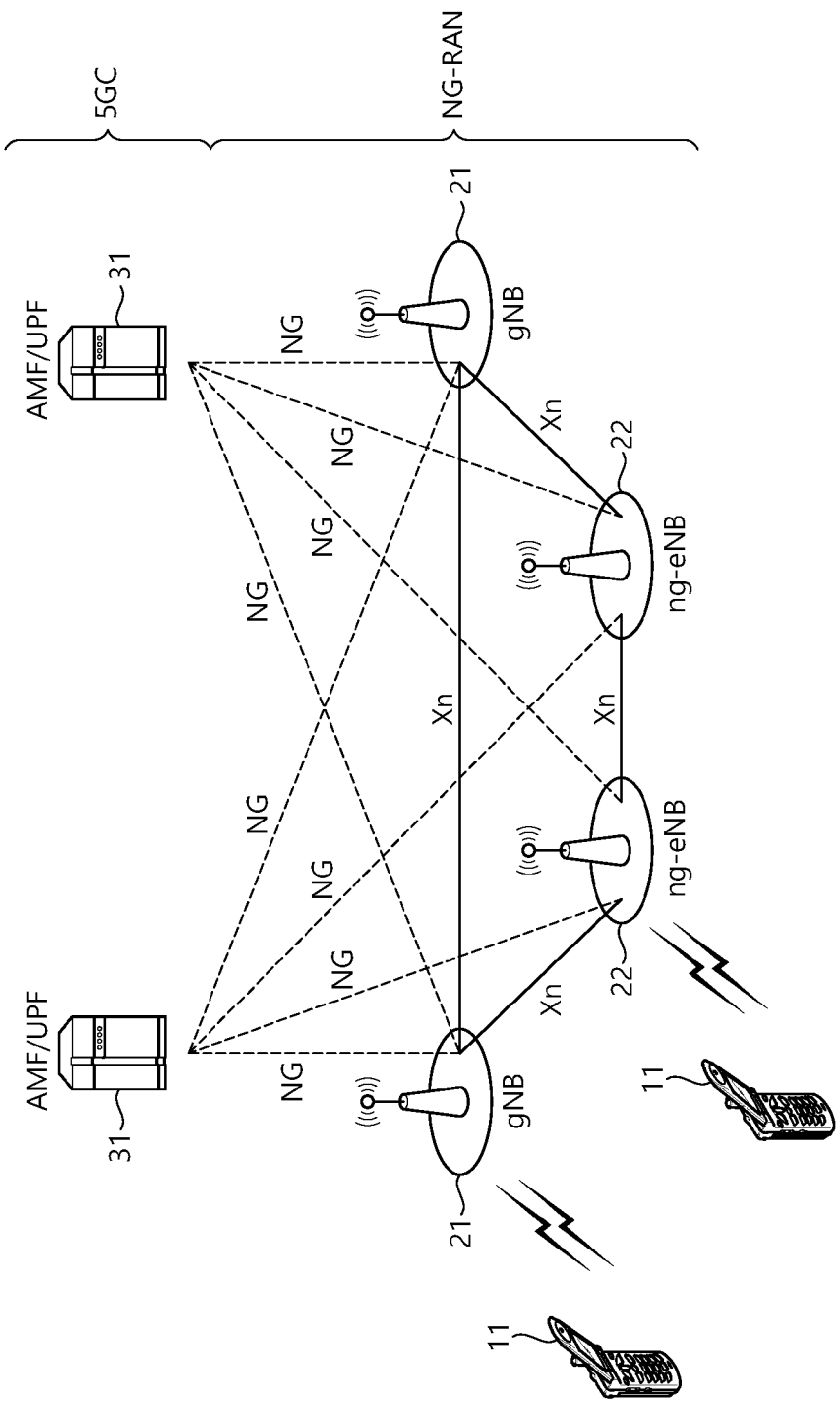

[Fig. 3]
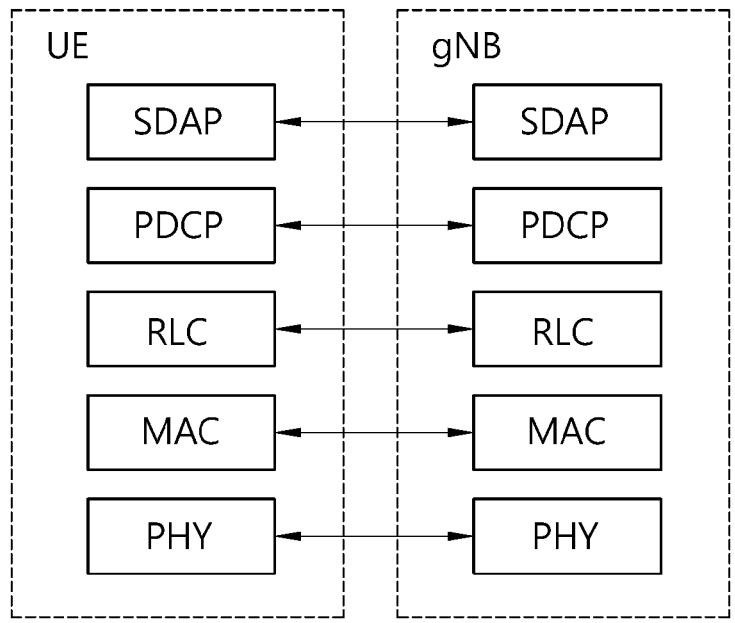
[Fig. 4]
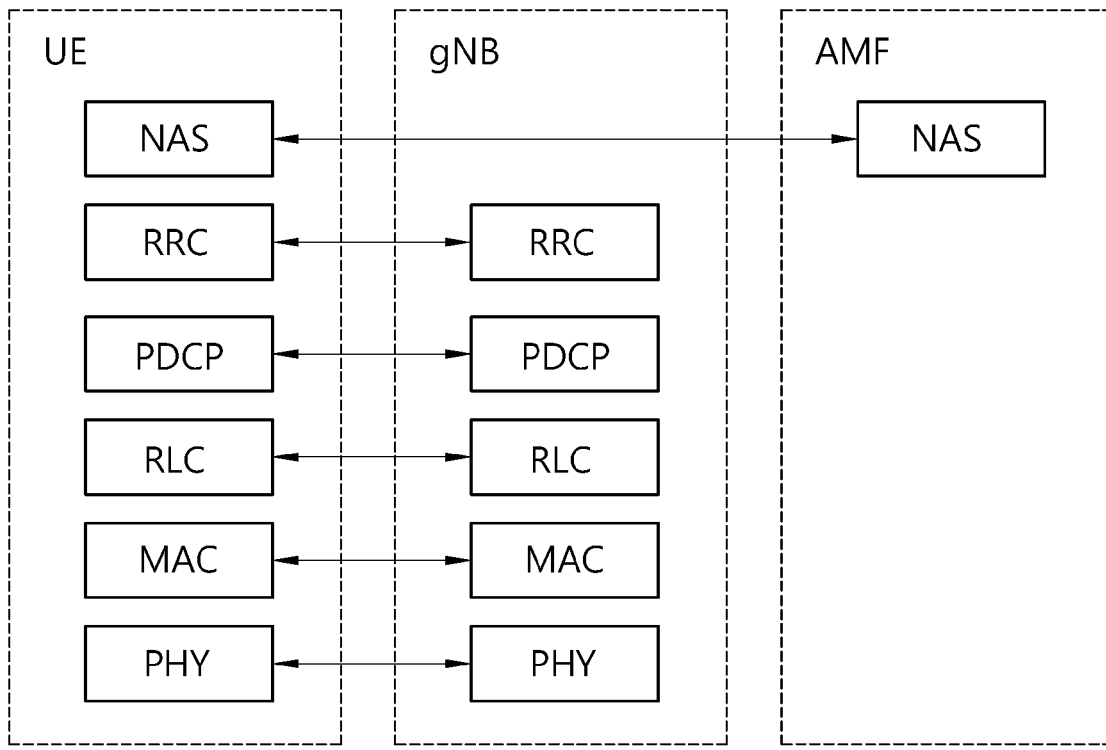

[Fig. 5]
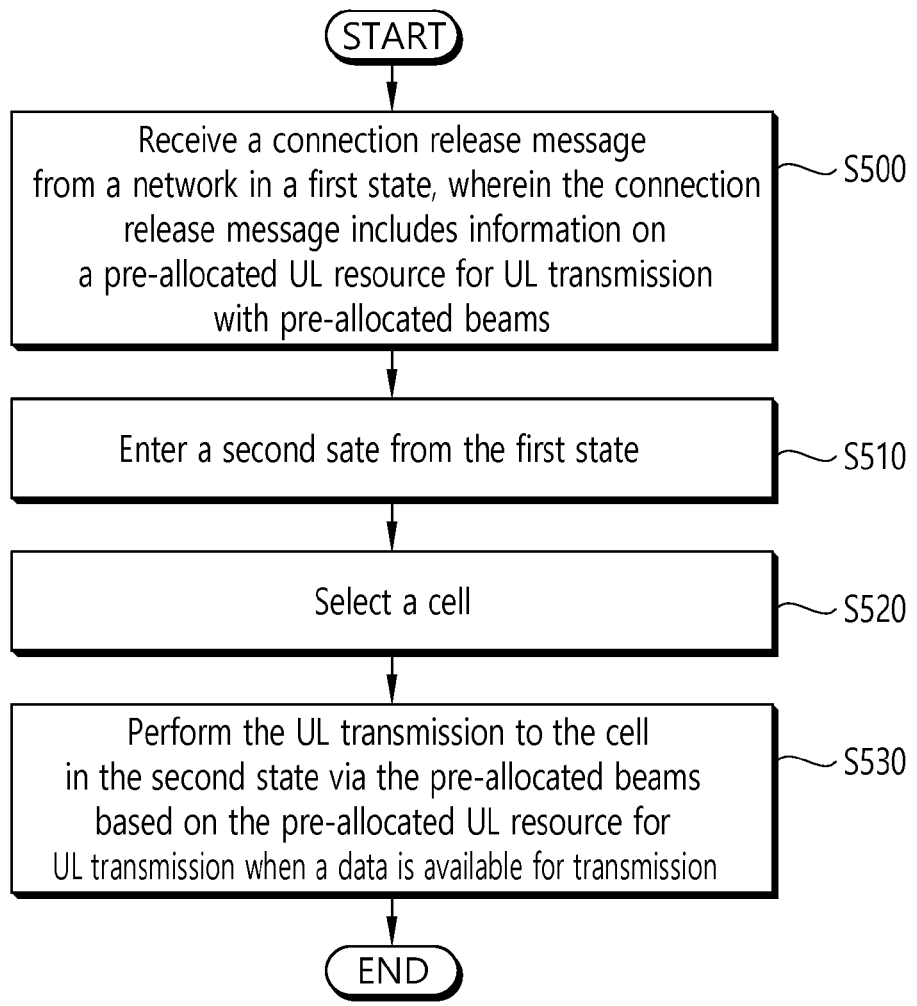

[Fig. 6]
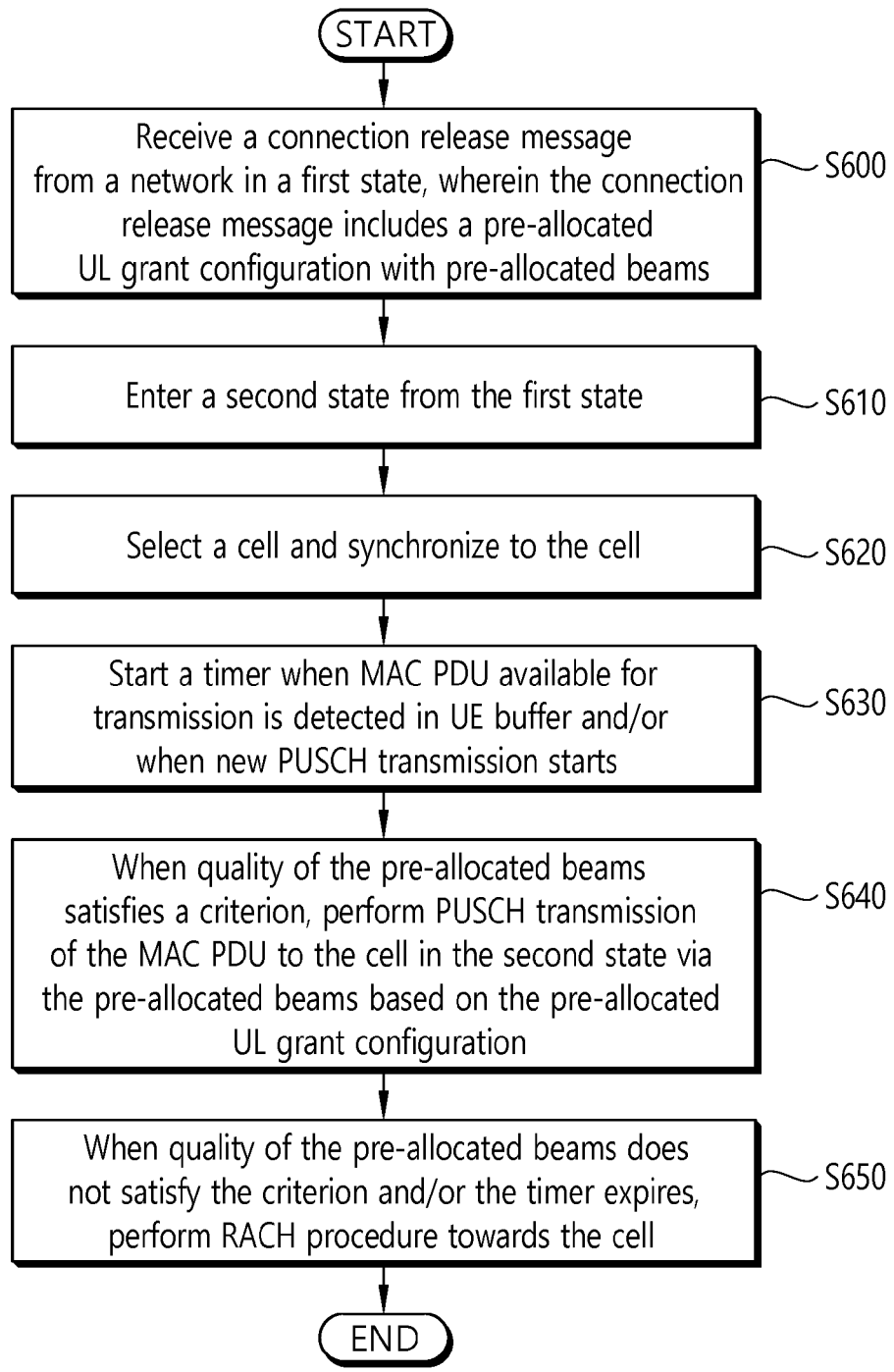

[Fig. 7]
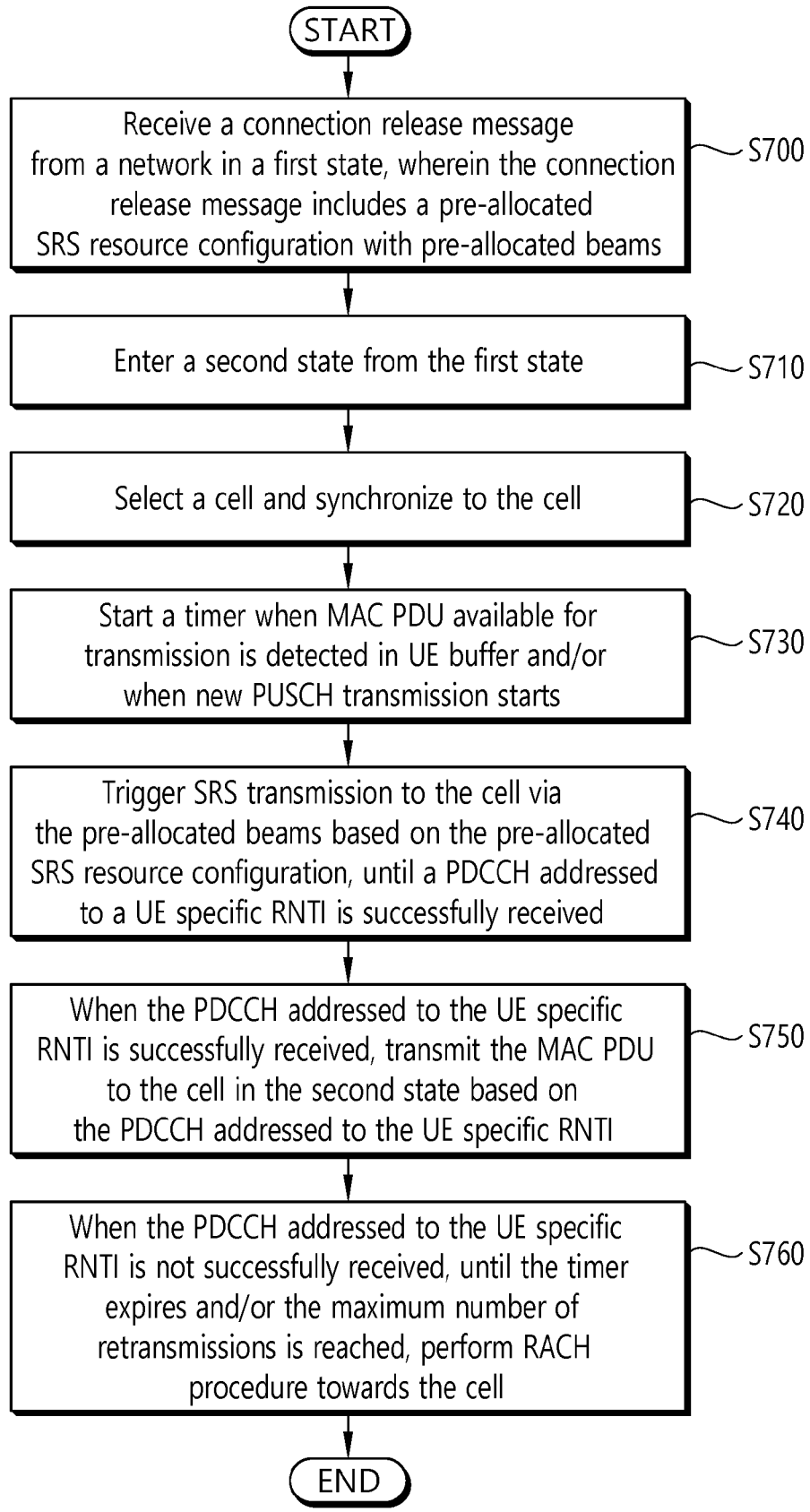

[Fig. 8]
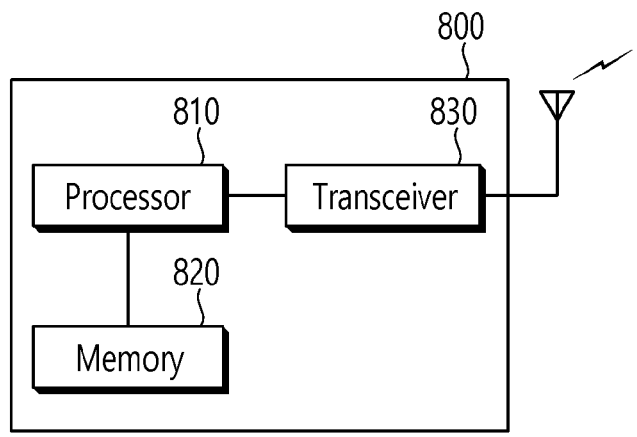
[Fig. 9]
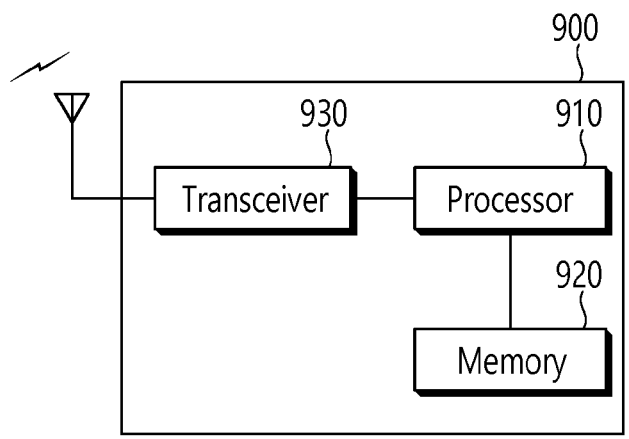

METHOD AND APPARATUS FOR PERFORMING UPLINK TRANSMISSION WITH PRE-ALLOCATED BEAMS IN WIRELESS COMMUNICATION SYSTEM

CROSS-REFERENCE TO RELATED APPLICATIONS

This application is the National Stage filing under 35 U.S.C. 371 of International Application No. PCT/KR2019/001792, filed on Feb. 14, 2019, which claims the benefit of U.S. Provisional Application No. 62/630,272 filed on Feb. 14, 2018, the contents of which are all hereby incorporated by reference herein in their entirety.

TECHNICAL FIELD

The present invention relates to wireless communications, and more particularly, to a method and apparatus for performing an uplink (UL) transmission with pre-allocated beams in a wireless communication system.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

SUMMARY

In NR, beam forming and high frequency are considered. In NR, the RACH procedure is used not only for the time synchronization but also for beam management. Indices of time/frequency random access resources are associated to corresponding beams. If preamble index is associated to corresponding Msg2 downlink transmission beam respectively, the gNB could find suitable beam for the UE from the received preamble index.

Data transmission in an inactive state and/or idle state has been discussed. Data transmission in an inactive state and/or idle state is performed with beam forming, some problem may occur.

In an aspect, a method performed by a user equipment (UE) in a wireless communication system is provided. The method includes receiving a connection release message from a network in a first state, wherein the connection release message includes information on a pre-allocated UL resource for UL transmission with pre-allocated beams, entering a second state from the first state, selecting a cell, and performing the UL transmission to the cell in the second state via the pre-allocated beams based on the pre-configured UL resource for UL transmission when a data is available for transmission.

In another aspect, a user equipment (UE) in a wireless communication system is provided. The UE includes a memory, a transceiver, and a processor, operably coupled to the memory and the transceiver, and configured to control the transceiver to receive a connection release message from a network in a first state, wherein the connection release message includes information on a pre-allocated UL resource for UL transmission with pre-allocated beams, enter a second state from the first state, select a cell, and control the transceiver to perform the UL transmission to the cell in the second state via the pre-allocated beams based on the pre-configured UL resource for UL transmission when a data is available for transmission.

Frequent data transmission failure can be avoided.

BRIEF DESCRIPTION OF THE DRAWINGS

FIG. 1 shows an example of a wireless communication system to which technical features of the present invention can be applied.

FIG. 2 shows another example of a wireless communication system to which technical features of the present invention can be applied.

FIG. 3 shows a block diagram of a user plane protocol stack to which technical features of the present invention can be applied.

FIG. 4 shows a block diagram of a control plane protocol stack to which technical features of the present invention can be applied.

FIG. 5 shows a method for transmitting data according to an embodiment of the present invention.

FIG. 6 shows a method for transmitting data according to another embodiment of the present invention.

FIG. 7 shows a method for transmitting data according to another embodiment of the present invention.

FIG. 8 shows a UE to implement an embodiment of the present invention.

FIG. 9 shows a BS to implement an embodiment of the present invention.

DETAILED DESCRIPTION

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (DL). For example, only OFDMA may be used for DL and only SC-FDMA may be used for UL. Alternatively, OFDMA and SC-FDMA may be used for DL and/or UL.

In this document, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A, B, C" may mean "at least one of A, B, and/or C."

Further, in the document, the term "or" should be interpreted to indicate "and/or." For instance, the expression "A or B" may comprise 1) only A, 2) only B, and/or 3) both A and B. In other words, the term "or" in this document should be interpreted to indicate "additionally or alternatively."

FIG. 1 shows an example of a wireless communication system to which technical features of the present invention can be applied. Specifically, FIG. 1 shows a system architecture based on an evolved-UMTS terrestrial radio access network (E-UTRAN). The aforementioned LTE is a part of an evolved-UTMS (e-UMTS) using the E-UTRAN.

Referring to FIG. 1, the wireless communication system includes one or more user equipment (UE; 10), an E-UTRAN and an evolved packet core (EPC). The UE 10 refers to a communication equipment carried by a user. The UE 10 may be fixed or mobile. The UE 10 may be referred to as another terminology, such as a mobile station (MS), a user terminal (UT), a subscriber station (SS), a wireless device, etc.

The E-UTRAN consists of one or more base station (BS) 20. The BS 20 provides the E-UTRA user plane and control plane protocol terminations towards the UE 10. The BS 20 is generally a fixed station that communicates with the UE 10. The BS 20 hosts the functions, such as inter-cell radio resource management (MME), radio bearer (RB) control, connection mobility control, radio admission control, measurement configuration/provision, dynamic resource allocation (scheduler), etc. The BS may be referred to as another terminology, such as an evolved NodeB (eNB), a base transceiver system (BTS), an access point (AP), etc.

A downlink (DL) denotes communication from the BS 20 to the UE 10. An uplink (UL) denotes communication from the UE 10 to the BS 20. A sidelink (SL) denotes communication between the UEs 10. In the DL, a transmitter may be a part of the BS 20, and a receiver may be a part of the UE 10. In the UL, the transmitter may be a part of the UE 10, and the receiver may be a part of the BS 20. In the SL, the transmitter and receiver may be a part of the UE 10.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 30 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 10 is connected to the BS 20 by means of the Uu interface. The UEs 10 are interconnected with each other by means of the PC5 interface. The BSs 20 are interconnected with each other by means of the X2 interface. The BSs 20 are also connected by means of the S1 interface to the EPC, more specifically to the MME by means of the S1-MME interface and to the S-GW by means of the S1-U interface. The S1 interface supports a many-to-many relation between MMEs/S-GWs and BSs.

FIG. 2 shows another example of a wireless communication system to which technical features of the present invention can be applied. Specifically, FIG. 2 shows a system architecture based on a 5G new radio access technology (NR) system. The entity used in the 5G NR system (hereinafter, simply referred to as "NR") may absorb some or all of the functions of the entities introduced in FIG. 1 (e.g. eNB, MME, S-GW). The entity used in the NR system may be identified by the name "NG" for distinction from the LTE/LTE-A.

Referring to FIG. 2, the wireless communication system includes one or more UE 11, a next-generation RAN (NG-RAN) and a 5th generation core network (5GC). The NG-RAN consists of at least one NG-RAN node. The NG-RAN node is an entity corresponding to the BS 10 shown in FIG. 1. The NG-RAN node consists of at least one gNB 21 and/or at least one ng-eNB 22. The gNB 21 provides NR user plane and control plane protocol terminations towards the UE 11. The ng-eNB 22 provides E-UTRA user plane and control plane protocol terminations towards the UE 11.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNBs and ng-eNBs are interconnected with each other by means of the Xn interface. The gNBs and ng-eNBs are also connected by means of the NG interfaces to the 5GC, more specifically to the AMF by means of the NG-C interface and to the UPF by means of the NG-U interface.

A protocol structure between network entities described above is described. On the system of FIG. 1 and/or FIG. 2, layers of a radio interface protocol between the UE and the network (e.g. NG-RAN and/or E-UTRAN) may be classified into a first layer (L1), a second layer (L2), and a third layer (L3) based on the lower three layers of the open system interconnection (OSI) model that is well-known in the communication system.

FIG. 3 shows a block diagram of a user plane protocol stack to which technical features of the present invention can be applied. FIG. 4 shows a block diagram of a control plane protocol stack to which technical features of the present invention can be applied. The user/control plane protocol stacks shown in FIG. 3 and FIG. 4 are used in NR. However, user/control plane protocol stacks shown in FIG. 3 and FIG. 4 may be used in LTE/LTE-A without loss of generality, by replacing gNB/AMF with eNB/MME.

Referring to FIG. 3 and FIG. 4, a physical (PHY) layer belonging to L. The PHY layer offers information transfer services to media access control (MAC) sublayer and higher layers. The PHY layer offers to the MAC sublayer transport channels. Data between the MAC sublayer and the PHY layer is transferred via the transport channels. Between different PHY layers, i.e., between a PHY layer of a transmission side and a PHY layer of a reception side, data is transferred via the physical channels.

The MAC sublayer belongs to L2. The main services and functions of the MAC sublayer include mapping between logical channels and transport channels, multiplexing/de-multiplexing of MAC service data units (SDUs) belonging to one or different logical channels into/from transport blocks (TB) delivered to/from the physical layer on transport channels, scheduling information reporting, error correction through hybrid automatic repeat request (HARQ), priority handling between UEs by means of dynamic scheduling, priority handling between logical channels of one UE by means of logical channel prioritization (LCP), etc. The MAC sublayer offers to the radio link control (RLC) sublayer logical channels.

The RLC sublayer belong to L2. The RLC sublayer supports three transmission modes, i.e. transparent mode (TM), unacknowledged mode (UM), and acknowledged mode (AM), in order to guarantee various quality of services (QoS) required by radio bearers. The main services and functions of the RLC sublayer depend on the transmission mode. For example, the RLC sublayer provides transfer of upper layer PDUs for all three modes, but provides error correction through ARQ for AM only. In LTE/LTE-A, the RLC sublayer provides concatenation, segmentation and reassembly of RLC SDUs (only for UM and AM data transfer) and re-segmentation of RLC data PDUs (only for AM data transfer). In NR, the RLC sublayer provides segmentation (only for AM and UM) and re-segmentation (only for AM) of RLC SDUs and reassembly of SDU (only for AM and UM). That is, the NR does not support concatenation of RLC SDUs. The RLC sublayer offers to the packet data convergence protocol (PDCP) sublayer RLC channels.

The PDCP sublayer belong to L2. The main services and functions of the PDCP sublayer for the user plane include header compression and decompression, transfer of user data, duplicate detection, PDCP PDU routing, retransmission of PDCP SDUs, ciphering and deciphering, etc. The main services and functions of the PDCP sublayer for the control plane include ciphering and integrity protection, transfer of control plane data, etc.

The service data adaptation protocol (SDAP) sublayer belong to L2. The SDAP sublayer is only defined in the user plane. The SDAP sublayer is only defined for NR. The main services and functions of SDAP include, mapping between a QoS flow and a data radio bearer (DRB), and marking QoS flow ID (QFI) in both DL and UL packets. The SDAP sublayer offers to 5GC QoS flows.

A radio resource control (RRC) layer belongs to L3. The RRC layer is only defined in the control plane. The RRC layer controls radio resources between the UE and the network. To this end, the RRC layer exchanges RRC messages between the UE and the BS. The main services and functions of the RRC layer include broadcast of system information related to AS and NAS, paging, establishment, maintenance and release of an RRC connection between the UE and the network, security functions including key management, establishment, configuration, maintenance and release of radio bearers, mobility functions, QoS management functions, UE measurement reporting and control of the reporting, NAS message transfer to/from NAS from/to UE.

In other words, the RRC layer controls logical channels, transport channels, and physical channels in relation to the configuration, reconfiguration, and release of radio bearers. A radio bearer refers to a logical path provided by L1 (PHY layer) and L2 (MAC/RLC/PDCP/SDAP sublayer) for data transmission between a UE and a network. Setting the radio bearer means defining the characteristics of the radio protocol layer and the channel for providing a specific service, and setting each specific parameter and operation method. Radio bearer may be divided into signaling RB (SRB) and data RB (DRB). The SRB is used as a path for transmitting RRC messages in the control plane, and the DRB is used as a path for transmitting user data in the user plane.

An RRC state indicates whether an RRC layer of the UE is logically connected to an RRC layer of the E-UTRAN. In LTE/LTE-A, when the RRC connection is established between the RRC layer of the UE and the RRC layer of the E-UTRAN, the UE is in the RRC connected state (RRC_CONNECTED). Otherwise, the UE is in the RRC idle state (RRC_IDLE). In NR, the RRC inactive state (RRC_INACTIVE) is additionally introduced. RRC_INACTIVE may be used for various purposes. For example, the massive machine type communications (MMTC) UEs can be efficiently managed in RRC_INACTIVE. When a specific condition is satisfied, transition is made from one of the above three states to the other.

A predetermined operation may be performed according to the RRC state. In RRC_IDLE, public land mobile network (PLMN) selection, broadcast of system information (SI), cell re-selection mobility, core network (CN) paging and discontinuous reception (DRX) configured by NAS may be performed. The UE shall have been allocated an identifier (ID) which uniquely identifies the UE in a tracking area. No RRC context stored in the BS.

In RRC_CONNECTED, the UE has an RRC connection with the network (i.e. E-UTRAN/NG-RAN). Network-CN connection (both C/U-planes) is also established for UE. The UE AS context is stored in the network and the UE. The RAN knows the cell which the UE belongs to. The network can transmit and/or receive data to/from UE. Network controlled mobility including measurement is also performed.

Most of operations performed in RRC_IDLE may be performed in RRC_INACTIVE. But, instead of CN paging in RRC_IDLE, RAN paging is performed in RRC_INACTIVE. In other words, in RRC_IDLE, paging for mobile terminated (MT) data is initiated by core network and paging area is managed by core network. In RRC_INACTIVE, paging is initiated by NG-RAN, and RAN-based notification area (RNA) is managed by NG-RAN. Further, instead of DRX for CN paging configured by NAS in RRC_IDLE, DRX for RAN paging is configured by NG-RAN in RRC_INACTIVE. Meanwhile, in RRC_INACTIVE, 5GC-NG-RAN connection (both C/U-planes) is established for UE, and the UE AS context is stored in NG-RAN and the UE. NG-RAN knows the RNA which the UE belongs to.

NAS layer is located at the top of the RRC layer. The NAS control protocol performs the functions, such as authentication, mobility management, security control.

The physical channels may be modulated according to OFDM processing and utilizes time and frequency as radio resources. The physical channels consist of a plurality of orthogonal frequency division multiplexing (OFDM) symbols in time domain and a plurality of subcarriers in frequency domain. One subframe consists of a plurality of OFDM symbols in the time domain. A resource block is a resource allocation unit, and consists of a plurality of OFDM symbols and a plurality of subcarriers. In addition, each subframe may use specific subcarriers of specific OFDM symbols (e.g. first OFDM symbol) of the corresponding subframe for a physical downlink control channel (PDCCH), i.e. L1/L2 control channel. A transmission time interval (TTI) is a basic unit of time used by a scheduler for resource allocation. The TTI may be defined in units of one or a plurality of slots, or may be defined in units of mini-slots.

The transport channels are classified according to how and with what characteristics data are transferred over the radio interface. DL transport channels include a broadcast channel (BCH) used for transmitting system information, a downlink shared channel (DL-SCH) used for transmitting user traffic or control signals, and a paging channel (PCH) used for paging a UE. UL transport channels include an uplink shared channel (UL-SCH) for transmitting user traffic or control signals and a random access channel (RACH) normally used for initial access to a cell.

Different kinds of data transfer services are offered by MAC sublayer. Each logical channel type is defined by what type of information is transferred. Logical channels are classified into two groups: control channels and traffic channels.

Control channels are used for the transfer of control plane information only. The control channels include a broadcast control channel (BCCH), a paging control channel (PCCH), a common control channel (CCCH) and a dedicated control channel (DCCH). The BCCH is a DL channel for broadcasting system control information. The PCCH is DL channel that transfers paging information, system information change notifications. The CCCH is a channel for transmitting control information between UEs and network. This channel is used for UEs having no RRC connection with the network. The DCCH is a point-to-point bi-directional channel that transmits dedicated control information between a UE and the network. This channel is used by UEs having an RRC connection.

Traffic channels are used for the transfer of user plane information only. The traffic channels include a dedicated traffic channel (DTCH). The DTCH is a point-to-point channel, dedicated to one UE, for the transfer of user information. The DTCH can exist in both UL and DL.

Regarding mapping between the logical channels and transport channels, in DL, BCCH can be mapped to BCH, BCCH can be mapped to DL-SCH, PCCH can be mapped to PCH, CCCH can be mapped to DL-SCH, DCCH can be mapped to DL-SCH, and DTCH can be mapped to DL-SCH. In UL, CCCH can be mapped to UL-SCH, DCCH can be mapped to UL-SCH, and DTCH can be mapped to UL-SCH.

In NR, operation of beams based on SS/PBCH blocks and CSI-RS is introduced. Furthermore, there is a discussion that data can be transmitted while in RRC_INACTIVE and/or RRC_IDLE, without transition to RRC_CONNECTED. If data is transmitted with beam operation while in RRC_INACTIVE and/or RRC_IDLE, the gNB may provide pre-allocated UL resource including a beam resource to the UE. However, when the UE performs UL transmission to the gNB with the pre-allocated UL resource, the pre-allocated UL resource would always not lead to successful UL transmission. For example, the pre-allocated beam may easily become unsuitable for this UE to perform UL transmission because a narrow beam would be more sensitive to radio channel variation, thereby UL transmission may be unsuccessful. Accordingly, transmission failure may occur frequently.

FIG. 5 shows a method for transmitting data according to an embodiment of the present invention.

In step S500, the UE receives a connection release message from a network in a first state. The connection release message includes information on a pre-allocated UL resource for UL transmission with pre-allocated beams. In step S510, the UE enters a second state from the first state. In step S520, the UE selects a cell. In step S530, the UE performs the UL transmission to the cell in the second state via the pre-allocated beams based on the pre-configured UL resource for UL transmission when a data is available for transmission.

The information on the pre-allocated UL resource may be a pre-allocated UL grant configuration, and the UL transmission is a PUSCH transmission of a MAC PDU. In this case, the pre-allocated UL resource may be UL resource for the PUSCH transmission which is pre-allocated based on the pre-allocated UL grant.

The UE may determine that a quality of the pre-allocated beams meets the criterion. The criterion may be indicated by the network. In this case, the UE may perform initial PUSCH transmission and/or a PUSCH retransmission of a MAC PDU to the cell via at least one beam among the pre-allocated beams based on the pre-allocated UL grant configuration. The UE may perform PUSCH retransmission of the MAC PDU to the cell via another beam among the pre-allocated beams based on the pre-allocated UL grant configuration, until an acknowledgment is received and/or the maximum number of retransmissions is reached.

When the UE determines that there is no pre-allocated beam of which quality meets the criterion and/or a timer expires, the UE may perform a random access procedure towards the cell. In the random access procedure, the UE may transmit a RACH preamble with a beam and then may (re-)transmit the MAC PDU upon receiving a random access response in response to the RACH preamble. The UE may start the timer when the MAC PDU is available for transmission in a UE buffer or when a new PUSCH transmission starts.

The UE may consider that transmission of the MAC PDU is successfully completed when an acknowledgement is received from the cell. The acknowledgement may be a PDCCH addressed to a UE-specific RNTI (e.g. C-RNTI). That is, the successful reception of a PDCCH transmission addressed to a UE specific RNTI may be considered as reception of the acknowledgment.

If the UE fails to receive the acknowledgment until a timer expires, and/or if the maximum number of (re-)transmissions is reached, the UE may trigger RACH procedure, RRC connection resume procedure, and/or RRC connection re-establishment procedure. In addition, if the UE fails to receive the acknowledgment until a timer expire, and/or if the maximum number of (re-)transmissions is reached, the UE may perform retransmission of the MAC PDU to the gNB via one or more beams which do not belong to the pre-allocated beams.

Alternatively, the information on the pre-allocated UL resource may be a pre-allocated sounding reference signal (SRS) configuration, and the UL transmission may be an SRS transmission. In this case, the pre-allocated UL resource may be UL resource for the SRS transmission which is pre-allocated based on the pre-allocated SRS configuration.

The SRS transmission may be performed until a PDCCH addressed to a UE-specific RNTI is successfully received. That is, the UE may trigger SRS transmission to the cell with the pre-allocated beams at one or more occasions based on the connection release message, if a MAC PDU is available for transmission in UE buffer, until the successful reception of the PDCCH addressed to the UE-specific RNTI. The UE may start a timer when the MAC PDU is available for transmission in a UE buffer or when a new PUSCH transmission starts. When the PDCCH addressed to the UE-specific RNTI is successfully received, the UE may transmit the MAC PDU to the cell via a PUSCH based on the PDCCH addressed to the UE-specific RNTI. When the PDCCH addressed to the UE-specific RNTI is not successfully received and/or the timer expires and/or a maximum number of SRS transmissions is reached, the UE may perform a random access procedure towards the cell. In the random access procedure, the UE may transmit a RACH preamble with a beam and then may (re-)transmit the MAC PDU upon receiving a random access response in response to the RACH preamble.

The first state may be an RRC connected state, i.e. RRC_CONNECTED. The second state may be an RRC inactive state, i.e. RRC_INACTIVE, and/or an RRC idle state, i.e. RRC_IDLE.

According to embodiment of the present invention shown in FIG. 5, when UL resource for UL transmission, i.e. PUSCH transmission and/or SRS transmission, is pre-configured with pre-allocated beams, and data transmission in RRC_INACTIVE and/or RRC_IDLE is allowed, the data transmission can be guaranteed with one or more beams among the pre-allocated beams with good condition. If there are no beam with good condition among the pre-allocated beams, the UE may fallback to RACH procedure to complete the data transmission. Therefore, more frequent failure of the data transmission can be avoided.

The more detailed description for embodiments of the present invention is as follows.

1. Pre-Allocated PUSCH Transmissions for UL Transmission in RRC_INACTIVE and/or RRC_IDLE FIG. 6 shows a method for transmitting data according to another embodiment of the present invention.

In step S600, the UE receives a connection release message from a network in a first state. The connection release message may be an RRC connection release message which directs the UE to RRC_INACTIVE and/or RRC_IDLE. The connection release message may include a pre-allocated UL grant configuration with pre-allocated beams. The pre-allocated beams may be associated with one or more SS/PBCH blocks and/or one or more CSI-RSs transmitted by a gNB. Alternatively, the pre-allocated UL grant configuration with pre-allocated beams may be received via system information.

In step S610, the UE enters a second state from the first state. The first state may be an RRC connected state, i.e. RRC_CONNECTED. The second state may be an RRC inactive state, i.e. RRC_INACTIVE, and/or an RRC idle state, i.e. RRC_IDLE.

In step S620, the UE performs cell reselection. The UE selects a cell of a gNB and synchronize to the cell.

In step S630, the UE starts a timer when MAC PDU available for transmission is detected in UE buffer and/or when new PUSCH transmission starts.

In step S640, when quality of the pre-allocated beams satisfies a criterion, the UE performs PUSCH transmission of the MAC PDU to the cell in the second state via the pre-allocated beams based on the pre-allocated UL grant configuration. A threshold for the criterion may be indicated by the network. If the quality of at least one beam among the pre-allocated beams is above a threshold indicated by the network, it may be determined that the criterion is met. That is, if the UE determines that the quality of one or more beams among the pre-allocated beams meets the criterion, the UE may perform initial PUSCH transmission and/or a PUSCH retransmission of a MAC PDU to the gNB via the one or more beams among the pre-allocated beams based on the pre-allocated UL grant configuration.

The UE may perform PUSCH retransmission of the MAC PDU to the gNB via one or more beams among the pre-allocated beams based on the pre-allocated UL grant configuration, until an acknowledgment is received and/or the maximum number of retransmissions is reached. The UE may perform PUSCH retransmission of the MAC PDU to the gNB via another one or more beams among the pre-allocated beams, if HARQ non-acknowledgement (NACK) to a previous PUSCH (re-)transmission is received, and/or if there is no pre-allocated beam of which quality meets the criterion. Alternatively, the used beam may belong to one of the other beams than the pre-allocated beams.

In step S650, when quality of the pre-allocated beams does not satisfy the criterion and/or the timer expires, the UE performs RACH procedure towards the cell. A threshold for the criterion may be indicated by the network. If qualities of all the pre-allocated beams are not above a threshold indicated by the network, it may be determined that the criterion is not met. That is, if the UE determines that there is no pre-allocated beam of which quality meets the criterion, the UE may perform RACH procedure. In the RACH procedure, the UE may transmit a RACH preamble with a beam and then (re-)transmit the MAC PDU upon receiving a random access response in response to the RACH preamble. The beam used for RACH preamble transmission may be configured by the connection release message. The beam may be associated with one of the pre-allocated beams based on SS/PBCH blocks and/or CSI-RSs of the cell.

The UE may consider that the transmission of the MAC PDU is successfully completed if an acknowledgment is received from the cell. The successful reception of a PDCCH addressed to a UE specific RNTI (e.g. C-RNTI) may be considered as reception of the acknowledgment from the gNB. Or, the successful reception of a particular MAC CE (e.g. UE contention resolution identity MAC CE) on the PDSCH indicated by a PDCCH addressed to a UE specific RNTI may be considered as reception of the acknowledgment from the gNB. If the acknowledgment is received and/or the UE goes to another state and/or the UE performs RRC resume procedure and/or the UE performs RAN area update procedure, the UE may release the pre-allocated UL grant configuration with the pre-allocated beams.

If the UE fails to receive the acknowledgment from the gNB until the timer expires, and/or if the maximum number of retransmissions is reached, the UE may trigger RACH procedure, RRC connection resume procedure, and/or RRC connection re-establishment procedure. If the UE fails to receive the acknowledgment from the gNB until the timer expires and/or if the maximum number of retransmissions is reached, the UE may perform retransmission of the MAC PDU to the gNB via one or more beams which do not belong to the pre-allocated beams.

According to embodiment of the present invention shown in FIG. 6, when the pre-allocated UL grant configuration is provided with pre-allocated beams, and data transmission in RRC_INACTIVE and/or RRC_IDLE is allowed, the data transmission can be guaranteed with one or more beams among the pre-allocated beams with good condition. If there are no beam with good condition among the pre-allocated beams, the UE may fallback to RACH procedure to complete the data transmission. Therefore, more frequent failure of the data transmission can be avoided.

2. Pre-Allocated SRS Transmissions for UL Transmission in RRC_INACTIVE and/or RRC_IDLE FIG. 7 shows a method for transmitting data according to another embodiment of the present invention.

In step S700, the UE receives a connection release message from a network in a first state. The connection release message may be an RRC connection release message which directs the UE to RRC_INACTIVE and/or RRC_IDLE. The connection release message may include a pre-allocated SRS configuration with pre-allocated beams. The pre-allocated beams may be associated with one or more SS/PBCH blocks and/or one or more CSI-RSs transmitted by a gNB. Alternatively, the pre-allocated SRS configuration with pre-allocated beams may be received via system information.

In step S710, the UE enters a second state from the first state. The first state may be an RRC connected state, i.e. RRC_CONNECTED. The second state may be an RRC inactive state, i.e. RRC_INACTIVE, and/or an RRC idle state, i.e. RRC_IDLE.

In step S720, the UE performs cell reselection. The UE selects a cell of a gNB and synchronize to the cell.

In step S730, the UE starts a timer when MAC PDU available for transmission is detected in UE buffer and/or when new PUSCH transmission starts.

In step S740, the UE triggers SRS transmission to the cell via the pre-allocated beams based on the pre-allocated SRS configuration, until a PDCCH addressed to a UE specific RNTI is successfully received. The UE may trigger SRS transmission at one or more occasions with one or more beams among the pre-allocated beams to the gNB based on the connection release message, if a MAC PDU available for transmission is detected in UE buffer, until the successful reception of a PDCCH transmission addressed to a UE specific RNTI (e.g. C-RNTI). The UE may select the one or more beams among the pre-allocated beams based on quality of the pre-allocated beams. The triggered SRS may be periodically transmitted every occasion with the one or more beams beam by switching the pre-allocated beam. The UE may adjust and/or increase transmission power of SRS transmission in the next occasion after one SRS is transmitted.

In step S750, when the PDCCH addressed to the UE specific RNTI is successfully received, the UE transmits the MAC PDU to the cell in the second state based on the PDCCH addressed to the UE specific RNTI. That is, the UE may transmit the MAC PDU to the gNB via PUSCH based on the received PDCCH addressed to the UE specific RNTI. The PDCCH may indicate UL grant including a beam resource and/or beam index used for transmission of the MAC PDU.

In step S760, when the PDCCH addressed to the UE specific RNTI is not successfully received until the timer expires and/or maximum number of SRS transmissions is reached, the UE performs RACH procedure towards the cell. In the RACH procedure, the UE may transmit a RACH preamble with a beam and then transmits the MAC PDU upon receiving a random access response in response to the RACH preamble.

If the UE fails to receive the acknowledgment from the gNB until the timer expires, and/or if the maximum number of MAC PDU retransmissions is reached, the UE may trigger RACH procedure, RRC connection resume procedure, and/or RRC connection re-establishment procedure. If the UE fails to receive the acknowledgment from the gNB until the timer expires and/or if the maximum number of MAC PDU retransmissions is reached, the UE may perform retransmission of the MAC PDU to the gNB via one or more beams which do not belong to the pre-allocated beams.

According to embodiment of the present invention shown in FIG. 7, when the pre-allocated SRS configuration is provided with pre-allocated beams, and data transmission in RRC_INACTIVE and/or RRC_IDLE is allowed, the data transmission can be guaranteed with one or more beams among the pre-allocated beams with good condition. If there are no beam with good condition among the pre-allocated beams, the UE may fallback to RACH procedure to complete the data transmission. Therefore, more frequent failure of the data transmission can be avoided.

FIG. 8 shows a UE to implement an embodiment of the present invention. The present invention described above for UE side may be applied to this embodiment.

A UE 800 includes a processor 810, a memory 820 and a transceiver 830. The processor 810 may be configured to implement proposed functions, procedures and/or methods described in this description. Layers of the radio interface protocol may be implemented in the processor 810.

Specifically, the processor 810 is configured to control the transceiver 830 to receive a connection release message from a network in a first state. The connection release message includes information on a pre-allocated UL resource for UL transmission with pre-allocated beams. The processor 810 is configured enter a second state from the first state. The processor 810 is configured to select a cell. The processor 810 is configured to control the transceiver 830 to perform the UL transmission to the cell in the second state via the pre-allocated beams based on the pre-configured UL resource for UL transmission when a data is available for transmission.

The information on the pre-allocated UL resource may be a pre-allocated UL grant configuration, and the UL transmission is a PUSCH transmission of a MAC PDU. In this case, the pre-allocated UL resource may be UL resource for the PUSCH transmission which is pre-allocated based on the pre-allocated UL grant.

The processor 810 may be configured to determine that a quality of the pre-allocated beams meets the criterion. The criterion may be indicated by the network. In this case, the processor 810 may be configured to control the transceiver 830 to perform initial PUSCH transmission and/or a PUSCH retransmission of a MAC PDU to the cell via at least one beam among the pre-allocated beams based on the pre-allocated UL grant configuration. The processor 810 may be configured to control the transceiver 830 to perform PUSCH retransmission of the MAC PDU to the cell via another beam among the pre-allocated beams based on the pre-allocated UL grant configuration, until an acknowledgment is received and/or the maximum number of retransmissions is reached.

When the processor 810 determines that there is no pre-allocated beam of which quality meets the criterion and/or a timer expires, the processor 810 may be configured to control the transceiver 830 to perform a random access procedure towards the cell. In the random access procedure, the processor 810 may be configured to control the transceiver 830 to transmit a RACH preamble with a beam and then (re-)transmit the MAC PDU upon receiving a random access response in response to the RACH preamble. The processor 810 may be configured to start the timer when the MAC PDU is available for transmission in a UE buffer or when a new PUSCH transmission starts.

The processor 810 may be configured to consider that transmission of the MAC PDU is successfully completed when an acknowledgement is received from the cell. The acknowledgement may be a PDCCH addressed to a UE-specific RNTI (e.g. C-RNTI). That is, the successful reception of a PDCCH transmission addressed to a UE specific RNTI may be considered as reception of the acknowledgment.

If the UE fails to receive the acknowledgment until a timer expires, and/or if the maximum number of (re-)transmissions is reached, the processor 810 may be configured to trigger RACH procedure, RRC connection resume procedure, and/or RRC connection re-establishment procedure. In addition, if the UE fails to receive the acknowledgment until a timer expire, and/or if the maximum number of (re-)transmissions is reached, the processor 810 may be configured to control the transceiver 830 to perform retransmission of the MAC PDU to the gNB via one or more beams which do not belong to the pre-allocated beams.

Alternatively, the information on the pre-allocated UL resource may be a pre-allocated sounding reference signal (SRS) configuration, and the UL transmission may be an SRS transmission. In this case, the pre-allocated UL resource may be UL resource for the SRS transmission which is pre-allocated based on the pre-allocated SRS configuration.

The SRS transmission may be performed until a PDCCH addressed to a UE-specific RNTI is successfully received. That is, the processor 810 may be configured to trigger SRS transmission to the cell with the pre-allocated beams at one or more occasions based on the connection release message, if a MAC PDU is available for transmission in UE buffer, until the successful reception of the PDCCH addressed to the UE-specific RNTI. The processor 810 may be configured to start a timer when the MAC PDU is available for transmission in a UE buffer or when a new PUSCH transmission starts. When the PDCCH addressed to the UE-specific RNTI is successfully received, the processor 810 may be configured to control the transceiver 830 to transmit the MAC PDU to the cell via a PUSCH based on the PDCCH addressed to the UE-specific RNTI. When the PDCCH addressed to the UE-specific RNTI is not successfully received and/or the timer expires and/or a maximum number of SRS transmissions is reached, the processor 810 may be configured to control the transceiver 830 to perform a random access procedure towards the cell. In the random access procedure, the processor 810 may be configured to control the transceiver 830 to transmit a RACH preamble with a beam and then (re-)transmit the MAC PDU upon receiving a random access response in response to the RACH preamble.

The first state may be an RRC connected state, i.e. RRC_CONNECTED. The second state may be an RRC inactive state, i.e. RRC_INACTIVE, and/or an RRC idle state, i.e. RRC_IDLE.

The memory 820 is operatively coupled with the processor 810 and stores a variety of information to operate the processor 810. The transceiver 830 is operatively coupled with the processor 810, and transmits and/or receives a radio signal.

The processor 810 may include application-specific integrated circuit (ASIC), other chipset, logic circuit and/or data processing device. The memory 820 may include read-only memory (ROM), random access memory (RAM), flash memory, memory card, storage medium and/or other storage device. The transceiver 830 may include baseband circuitry to process radio frequency signals. When the embodiments are implemented in software, the techniques described herein can be implemented with modules (e.g., procedures, functions, and so on) that perform the functions described herein. The modules can be stored in the memory 820 and executed by the processor 810. The memory 820 can be implemented within the processor 810 or external to the processor 810 in which case those can be communicatively coupled to the processor 810 via various means as is known in the art.

According to embodiment of the present invention shown in FIG. 8, when UL resource for UL transmission, i.e. PUSCH transmission and/or SRS transmission, is pre-configured with pre-allocated beams, and data transmission in RRC_INACTIVE and/or RRC_IDLE is allowed, the data transmission can be guaranteed with one or more beams among the pre-allocated beams with good condition. If there are no beam with good condition among the pre-allocated beams, the UE may fallback to RACH procedure to complete the data transmission. Therefore, more frequent failure of the data transmission can be avoided.

FIG. 9 shows a BS to implement an embodiment of the present invention. The present invention described above for BS side may be applied to this embodiment. The BS may be a gNB in the description above.

A BS 900 includes a processor 910, a memory 920 and a transceiver 930. The processor 910 may be configured to implement proposed functions, procedures and/or methods described in this description. Layers of the radio interface protocol may be implemented in the processor 910.

Specifically, the processor 910 is configured to control the transceiver 930 to transmit information on a pre-allocated UL resource for UL transmission with pre-allocated beams to the UE. The information on the pre-allocated UL resource may be a pre-allocated UL grant configuration, and the UL transmission may be a PUSCH transmission. In this case, the pre-allocated UL resource may be UL resource for the PUSCH transmission which is pre-allocated based on the pre-allocated UL grant. Alternatively, the information on the pre-allocated UL resource may be a pre-allocated SRS configuration, and the UL transmission may be an SRS transmission. In this case, the pre-allocated UL resource may be UL resource for the SRS transmission which is pre-allocated based on the pre-allocated SRS resource configuration.

The processor 910 may be configured to control the transceiver 930 to receive initial PUSCH transmission and/or a PUSCH retransmission for a MAC PDU from the UE via at least one beam among the pre-allocated beams based on the pre-allocated UL grant. The processor 910 may be configured to control the transceiver 930 to transmit an acknowledgement for the initial PUSCH transmission and/or a PUSCH retransmission for the MAC PDU. The acknowledgement may be PDCCH addressed to the UE-specific RNTI. The processor 910 may be configured to control the transceiver 930 to receive PUSCH retransmission of the MAC PDU from the UE via another beam among the pre-allocated beams based on the pre-allocated UL grant.

The processor 910 may be configured to control the transceiver 930 to perform a random access procedure with the UE. In the random access procedure, the processor 910 may be configured to control the transceiver 930 to receive a RACH preamble with a beam from the UE, and to (re-)receive the MAC PDU upon transmitting a random access response in response to the RACH preamble.

The processor 910 may be configured to control the transceiver 930 to receive SRS. The processor 910 may be configured to control the transceiver 930 to transmit an acknowledgement for SRS transmission. The acknowledgement may be PDCCH addressed to the UE-specific RNTI.

The memory 920 is operatively coupled with the processor 910 and stores a variety of information to operate the processor 910. The transceiver 930 is operatively coupled with the processor 910, and transmits and/or receives a radio signal.

The processor 910 may include ASIC, other chipset, logic circuit and/or data processing device. The memory 920 may include ROM, RAM, flash memory, memory card, storage medium and/or other storage device. The transceiver 930 may include baseband circuitry to process radio frequency signals. When the embodiments are implemented in software, the techniques described herein can be implemented with modules (e.g., procedures, functions, and so on) that perform the functions described herein. The modules can be stored in the memory 920 and executed by the processor 910. The memory 920 can be implemented within the processor 910 or external to the processor 910 in which case those can be communicatively coupled to the processor 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What is claimed is:

1. A method performed by a user equipment (UE) in a wireless communication system, the method comprising:
   receiving a connection release message from a network in a first state, wherein the connection release message includes information on a pre-allocated UL resource for UL transmission with pre-allocated beams;
   entering a second state from the first state;
   selecting a cell; and
   performing the UL transmission to the cell in the second state via the pre-allocated beams based on the pre-configured UL resource for UL transmission when a data is available for transmission.

2. The method of claim 1, wherein the information on the pre-allocated UL resource is a pre-allocated UL grant configuration, and
   wherein the UL transmission is a physical uplink shared channel (PUSCH) transmission of a media access control (MAC) protocol data unit (PDU).

3. The method of claim 2, wherein a quality of the pre-allocated beams meets a criterion.

4. The method of claim 2, further comprising performing PUSCH retransmission of the MAC PDU to the cell via the pre-allocated beams based on the pre-allocated UL resource until an acknowledgement is received from the cell and/or a maximum number of retransmission is reached.

5. The method of claim 2, further comprising performing a random access procedure towards the cell when a quality of the pre-allocated beams does not meet a criterion and/or a timer expires.

6. The method of claim 5, further comprising starting the timer when the MAC PDU is available for transmission in a UE buffer or when a new PUSCH transmission starts.

7. The method of claim 2, further comprising considering that transmission of the MAC PDU is successfully completed when an acknowledgement is received from the cell.

8. The method of claim 7, wherein the acknowledgement is a physical downlink control channel (PDCCH) addressed to a UE-specific radio network temporary identity (RNTI).

9. The method of claim 1, wherein the information on the pre-allocated UL resource is a pre-allocated sounding reference signal (SRS) configuration, and
   wherein the UL transmission is an SRS transmission.

10. The method of claim 9, wherein the SRS transmission is performed until a PDCCH addressed to a UE-specific RNTI is successfully received.

11. The method of claim 10, further comprising a MAC PDU to the cell via a PUSCH based on the PDCCH addressed to the UE-specific RNTI, when the PDCCH addressed to the UE-specific RNTI is successfully received.

12. The method of claim 10, further comprising performing a random access procedure towards the cell, when the PDCCH addressed to the UE-specific RNTI is not successfully received and/or a timer expires and/or a maximum number of SRS transmissions is reached.

13. The method of claim 1, wherein the first state is a radio resource control (RRC) connected state.

14. The method of claim 1, wherein the second state is an RRC inactive state and/or an RRC idle state.

15. The method of claim 1, wherein the UE device is in communication with at least one of a mobile device, a network, and/or autonomous vehicles other than the UE.

16. A user equipment (UE) in a wireless communication system, the UE comprising:
   a memory;
   a transceiver; and
   a processor, operably coupled to the memory and the transceiver, and configured to:
   control the transceiver to receive a connection release message from a network in a first state, wherein the connection release message includes information on a pre-allocated UL resource for UL transmission with pre-allocated beams;
   enter a second state from the first state;
   select a cell; and
   control the transceiver to perform the UL transmission to the cell in the second state via the pre-allocated beams based on the pre-configured UL resource for UL transmission when a data is available for transmission.

* * * * *